March 30, 1965 C. D. NITCHIE 3,175,300
MECHANISM FOR CONTROLLING THE HEATING OF CORRUGATED BOARD BY
INJECTION OF AN AIR FILM BETWEEN THE
BOARD AND HEATING SURFACE
Filed March 12, 1962 2 Sheets-Sheet 1
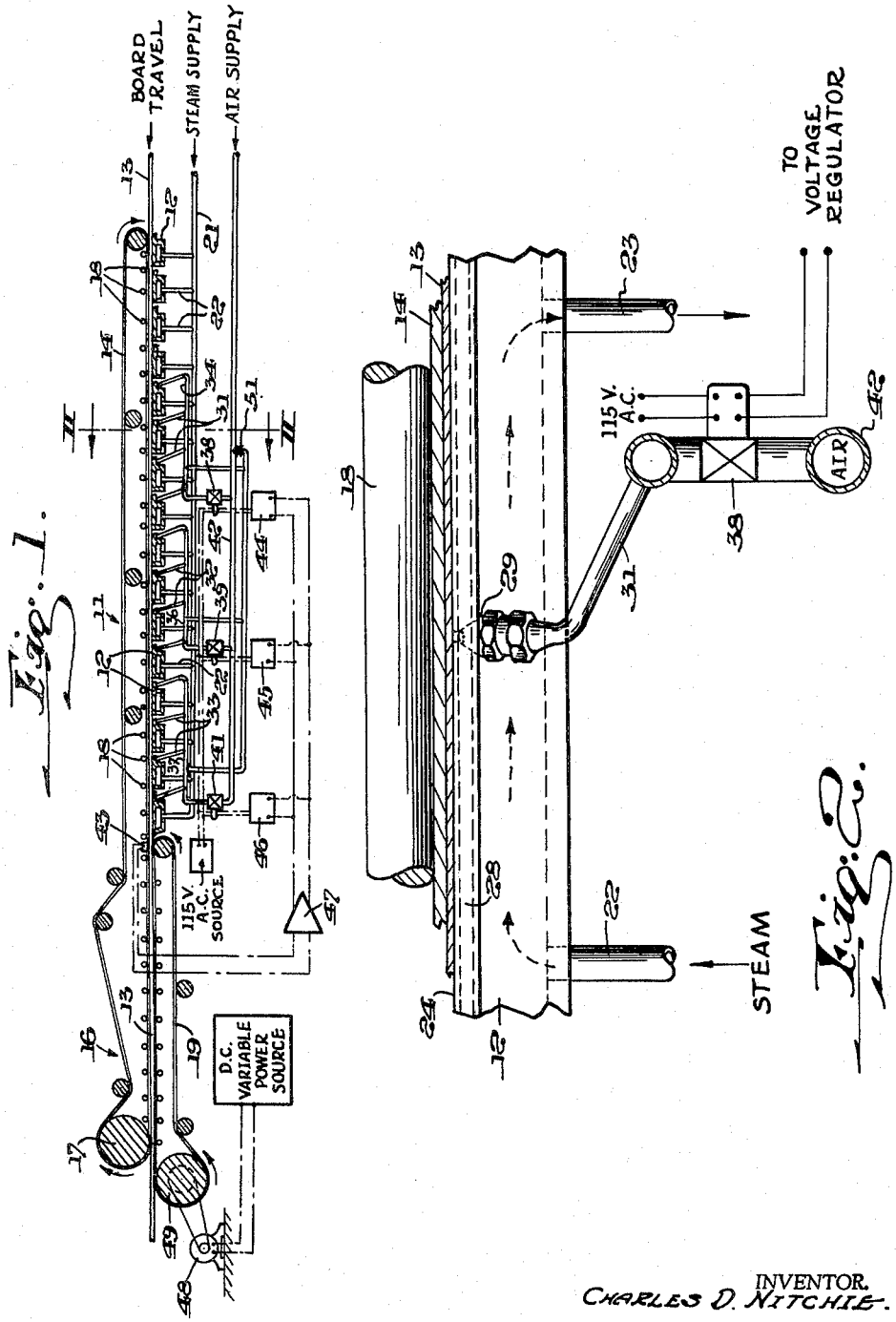
INVENTOR.
CHARLES D. NITCHIE.
BY
Leo J. MaLossi
his
ATTORNEY March 30, 1965
C. D. NITCHIE
3,175,300
MECHANISM FOR CONTROLLING THE HEATING OF CORRUGATED BOARD BY
INJECTION OF AN AIR FILM BETWEEN THE
BOARD AND HEATING SURFACE
Filed March 12, 1962
2 Sheets-Sheet 2
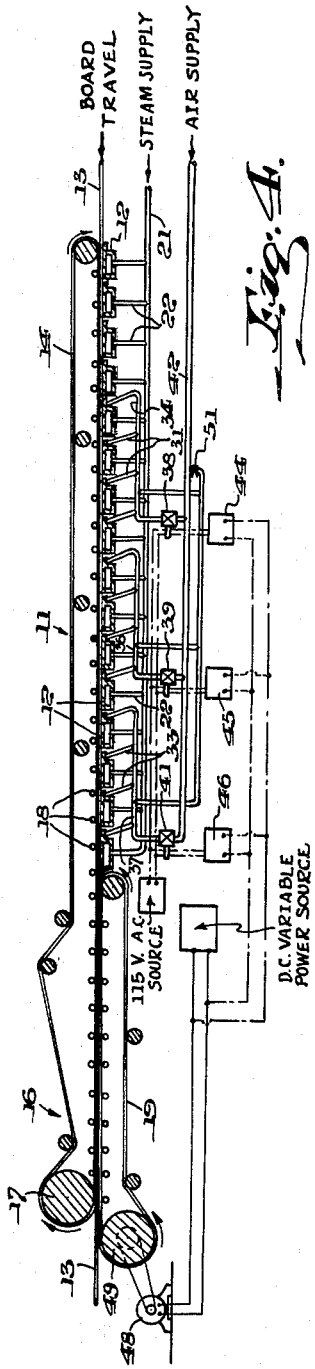
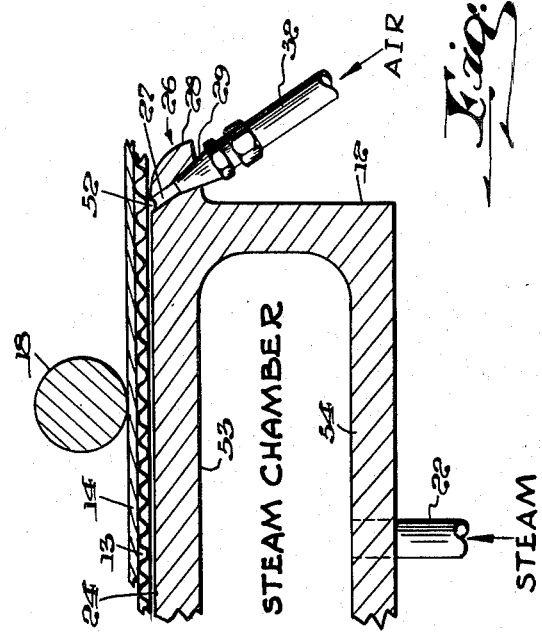
INVENTOR.
CHARLES D. NITCHIE.
BY
Leo J. Ma Lossi.
his
ATTORNEY

3,175,300
MECHANISM FOR CONTROLLING THE HEATING OF CORRUGATED BOARD BY INJECTION OF AN AIR FILM BETWEEN THE BOARD AND HEATING SURFACE
Charles D. Nitchie, Baltimore, Md., assignor to Koppers Company, Inc., a corporation of Delaware
Filed Mar. 12, 1962, Ser. No. 178,973
2 Claims. (Cl. 34—48)

This invention relates to the manufacture of corrugated paperboard and, more particularly, to improved methods and apparatus for regulating the temperature of the board during its passage through the heating section of the combiner machine.

In the manufacture of double-face corrugated board from sheets of continuously advancing paper, the manufacturing sequence involves heating and moistening one of the sheets; passing this sheet between heated, corrugated rollers; applying adhesive to the crown of each of the corrugations produced; passing the corrugated sheet and a plain facing sheet to be combined therewith between a smooth, heated roller and one of the corrugating rollers whereby under pressure a single corrugated sheet is formed; applying adhesive to the opposite side of the corrugated sheet at the crowns of the corrugations; bringing a second facing sheet into engagement with the adhesive-coated crowns to produce a combined section or assembly; drawing the assembly of sheets over a series of heated plates and simultaneously applying pressure to the assembly urging it into contact with the heated plates and delivering the stiff double-face corrugated sheet thus manufactured to suitable cutting mechanisms to subdivide the web into portions of the desired width and length.

The purpose of the simultaneous application of heat and pressure in the double-backer is to provide positive engagement between the adhesive-coated crowns and the liner being combined therewith coincident with acceleration of the setting rate of the adhesive by means of heat. The heat which is provided in the series of hot plates or platens employed in the heating section is usually far in excess of the minimum heat needed to set the adhesive since the quantity of heat to be supplied must be sufficient to dissipate the moisture given off by the glue and, as well, the moisture in the moving corrugated board itself.

Heat transfer from the platens to the moving web is effected by introducing steam under pressure to the interior of the platens to raise the temperature thereof primarily utilizing the latent heat of the steam and then passing the corrugated board over the smooth flat exterior surface of the hot platens at a given speed, in this case the production speed.

Unfortunately, during the manufacturing operation, it sometimes becomes necessary to stop the passage of the web through the double-backer for a short period, or to temporarily operate at a substantially lower speed than that set for optimum heat transfer. In the event of such a decrease in speed or stoppage of the feed, that corrugated board material which remains in or is passing through the heating section of the double-backer receives a total exposure to the hot platens which is often far in excess of that which may be safely employed. Should this occur the starch adhesive may be overcooked and become brittle by the high heat transfer and as the result brittle board or board with undesirable shrinkage or warpage may be produced.

Another circumstance in addition to a decrease of web speed which may be responsible for the production of heat-damaged board in the double-backer is the variation in the physical properties of the paper employed in this manufacture. Thus, even when the temperature of the platens and the speed of the web remain at relatively constant values, it is desirable for the operator to make a simple dial setting on a temperature control whenever a change in web properties will result from a change in one or more of the component sheets of paper.

It is, therefore, an object of the present invention to prevent injury to the corrugated paperboard ordinarily resulting from abnormally extensive heating.

It is another object of the present invention to provide a method and apparatus for selectively introducing compressed air between the web and the heating surface in the double-backer.

It is a further object of the present invention to provide a method and apparatus for introducing compressed air between this heating surface and the web over a selectively variable area of the heating surface.

Still a further object of the present invention is the provision of automatic control means governing the admission of compressed air between the heating surface and the web of corrugated paperboard.

In accordance with the invention the above objects are secured by placing in combination with the heating platens means for introducing through that wall of the platen in contact with the moving web sufficient air under greater than atmospheric pressure to form a film of air between the exterior surface of the wall of the platen and the corrugated board.

Further objects and advantages of the invention will be in part obvious and in part specifically referred to in the description hereinafter contained which taken in conjunction with the accompanying drawings discloses, somewhat schematically, a preferred form of the protective device arranged to operate in accordance with this invention; the disclosure however should be considered as merely illustrative of the invention in its broader aspects.

In the drawings:
FIGURE 1 is a longitudinal sectional view, largely schematic, taken through a double-backer incorporating a preferred embodiment of the present invention therein,
FIGURE 2 is a section on line 2—2 of FIGURE 1 looking in the direction of the arrows,
FIGURE 3 is an enlarged sectional view showing one variation by which compressed air can be introduced between the upper surface of the heated platen and the underside of the corrugated board and
FIGURE 4 is a longitudinal sectional view, largely schematic, taken through a double-backer machine incorporating a second embodiment of the present invention.

The conventional corrugating machine essentially comprises a corrugating and gluing section, a heating or facing section and a cooling section. Since the corrugating and gluing section form no part of this invention and is well known in the art, it has been omitted from the drawings. As shown schematically in FIGURE 1, the heating section 11 is represented as a series of hot platens 12 with the balance of the conventional structure such as the housing and supporting members eliminated therefrom for the sake of simplicity.

As the freshly glued corrugated sheet 13 advances through heating or drying section 11, it passes in sliding contact with platens 12 which extend transverse to the path of board travel. The corrugated sheet 13 is held in close contact with platens 12 by a ballast belt 14 which also serves as the upper belt of the pulling section 16. Belt 14 is driven by roll 17 at the discharge end of the double-backer. A series of ballast rollers 18, suitably journaled in bearing blocks (not shown), rest upon the lower run of the ballast belt 14 urging belt 14 against the upper surface of corrugated sheet 13. Ballast belt 14 is driven by roll 17 in the direction indicated by the arrows at a speed corresponding to the speed of the advancing corrugated board 13, since the combined action of ballast belt 14 and lower belt 19 acting on opposite sides of board 13 serve to pull the board through the hot section. The length of the heating section 11, the temperature of platens 12 and the speed of travel of corrugated sheet 13 through the hot section 11 are design factors determined by the amount of heat transfer to the moving board required to completely dry the freshly glued sheet 13 as it advances linearly over the surface of platens 12.

High pressure steam from a boiler (not shown) is delivered to inlet manifold 21. From manifold 21, the steam passes through parallel lines 22 to the interiors of hollow platens 12. As indicated by the arrows in FIGURE 2, the steam then flows out of platens 12 through parallel lines 23 to an outlet manifold (not shown) disposed at a lower level to provide gravity flow for any condensate formed in the interior of platens 12.

In the arrangement shown in FIGURE 1, it may be readily ascertained that the steam entering the upstream platens (those platens near the point of entry of board 13 to heating section 11) will be heated to a higher temperature than the platens further downstream. In general, this arrangement is suitable since the heat transferred to the moving board immediately after entry into the heating section 11 will be retained in part by the board as it continues through the hot section 11. Thus, it will take less heat from downstream platens 12 to maintain the board 13 at the desired temperature.

As noted above, certain conditions prevail at times during the manufacturing operation, for example, when the slitter-scorer and the cut-off knife are being reset to produce blanks of different sizes, when the feed of the material through the double-backer is substantially reduced and perhaps even completely stopped. To prevent excessive heating of the board in the hot section during these times whereby the starch adhesive would be overcooked and rendered brittle and excessive moisture would be driven from the board causing the board to become overdry and warped and the glue line to become brittle, the present invention introduces a film of air under pressure between corrugated board 13 and the heat transfer surface 24 of platens 12. In both embodiments illustrated in FIGURES 1 through 4 the compressed air is introduced near the leading edge 26 of the upper surfaces 24 through hole 27 which penetrates lip 28. The fitting 29 is affixed by welding or brazing, for instance, to lip 28 in alignment and in register with hole 27 and receives compressed air from the manifold via the lateral and branch lines described below.

In heating section 11, there are a large number of hot platens 12 which for the purpose of the present invention are preferably divided into groups with compressed air passing in parallel through the branch lines 31, 32 or 33 simultaneously to each platen of any given group. The branch lines 31, 32 and 33 are connected respectively to laterals 34, 36 and 37 which, as shown, serve the individual groups of four platens each, the groups being arranged in series beginning near the downstream end of heating section 11. Laterals 34, 36 and 37 are provided with solenoid valves 38, 39 and 41 respectively which establish or cut off flow from manifold 42 through these laterals to branch lines 31, 32 and 33.

The preferred control system for solenoid valves 38, 39 and 41 employs a temperature detecting device such as surface pyrometer 43 (well-known in the art and commercially available) located directly over corrugated web 13 past the downstream end of heating section 11. The signal voltage produced by pyrometer 43 is proportional to the temperature of the upper liner of sheet 13. Voltage regulators 44, 45 and 46 are connected in parallel with surface pyrometer 43 and receive the signal voltages generated thereby after amplification by amplifier 47. These voltage regulators 44, 45 and 46 are electrically connected in turn to the solenoid actuators or coils of solenoid valves 38, 39 and 41 respectively.

In operation, at maximum board speed (production line speed) no air is introduced between the surface of the platens 12 and the board 13, but as the board speed progressively decreases the temperature of the board and, therefore, of the upper liner thereof, increases causing a signal voltage to be generated by pyrometer 43.

When this signal voltage after amplification reaches a given value, voltage regulator 46 operates to close the circuit in the coil in solenoid valve 41 whereby this solenoid is energized moving valve 38 to its open position. With valve 38 so positioned, compressed air from the air supply is delivered to the upper surface of each of the platens in the group adjacent the discharge end of the heating section 11 via lateral 37, branch line 33, fitting 29 and hole 27. As air is delivered to this position, a film of this compressed air is introduced between the surfaces 24 of the platens in this particular group and the board 13 passing thereover. This film of air, because of its poor heat transfer properties, reduces the transmission of heat from the hot platens to the board thereby preventing further increase in the temperature of the board.

If the speed of the board continues to decrease further increasing the temperature thereof whereby the signal voltage generated by pyrometer 43 exceeds the rated voltage at which voltage regulator 45 is operated, a similar sequence occurs to place solenoid valve 39 in its open position admitting air under pressure over the heating surfaces of the group of four platens further upstream of the group aforementioned.

If the decrease in heat transmission produced by the air films over the hot platens 12 of the latter-mentioned two groups of platens is still not sufficient to offset the increase in temperature produced by still a further decrease in the board speed, the voltage generated by surface pyrometer 43 and amplified by amplifier 47 may exceed the rating for voltage regulator 44 whereby solenoid valve 38 is opened admitting compressed air to the upper surface of still another group of platens next in series progressing upstream.

Although three groups of four platens each are illustrated in FIGURE 1 it is to be understood that any number of platens may be interconnected as a group in the manner shown and any number of groups may be employed to provide various measures of control over the heating operation.

At the beginning of a production run in order to facilitate threading the web through the heating section 11, manually-controlled valve 51 may be opened to permit air from manifold 42 to by-pass the solenoid valves 38, 39 and 41 which are in their normal closed position. It is desirable to supply a film of air between the web and the surface of the plates at this time not only to reduce the transfer of heat from the heated platens 12 to the board 13 but also to provide a lubricating film therebetween in order to reduce frictional forces and decrease the tendency of the newly introduced web to slip. Fortunately the film of air effectively serves both these functions.

Shortly after starting motor 48 manual valve 51 is closed and the system reverts to automatic control. As the temperature of surface pyrometer 43 increases, voltage regulators 44, 45 and 46 become operative in that sequence until at production speed all valves 38, 39 and 41 are in the open position and air under pressure greater than atmospheric is being supplied to the surface of all platens so equipped.

Because heat control is secured in the preferred embodiment by direct measurement of the temperature of board 13 as it leaves the heating section 11, control by this method is independent of the deleterious influences of changes in board speed, changes in board thickness, changes in the condition of the paper components of the web, changes in the thickness of the webs or changes in the material of which the webs are comprised.

Various arrangements may, of course, be incorporated in the system to change the sequence of valve actuation to smoothly execute the transition to production speed whereby the temperature of the board as it leaves heating section 11 will remain substantially constant and damage to the board is obviated or at least minimized.

In FIGURE 4 an alternate method of controlling the actuation of voltage regulators 44, 45 and 46 is schematically represented. In this embodiment, voltage regulators 44, 45 and 46 are connected in parallel with the leads providing energy to variable speed motor 48 from the power source shown. With this arrangement each of the voltage regulators receives the armature voltage prevalent at any instant in motor 48 as it changes speed to drive the double-backer. As the motor 48 increases speed and the armature voltage increases to values exceeding the rated voltages of voltage regulators 44, 45 and 46, each in turn, these regulators are actuated to close solenoid valves 38, 39 and 41 respectively. As the motor 48 decreases its speed in accordance with interferences in normal production speed and the armature voltage decreases below the rated voltages of voltage regulators 46, 45 and 44, each in turn, these regulators are again actuated to allow solenoid valves 41, 39 and 38 to return to their normally open positions. In this manner the speed of board 13 is made determinative of the temperature of board 13.

As stated above, solenoid valves 38, 39 and 41 are biased to a normally open position in this embodiment contrary to the normally closed position of like solenoids employed in the case of the preferred embodiment. In more detail, therefore, at the initiation of a run of corrugated board all solenoid valves are in the open position and every platen so equipped is receiving air under pressure. Once again, the advantages of this arrangement is that threading of the web through the hot section 11 is facilitated and the starting and bringing up to speed of motor 48 is accomplished under decreased load due to the lubricating qualities of the film of air between platens 12 and board 13.

As the variable speed motor increases its speed voltage regulator 44, which operates solenoid valve 38 controlling the group of air-equipped platens 12 furthest upstream, is operated thereby closing solenoid valve 38 and shutting off the supply of air to that group of platens.

Further increase in the speed of motor 48 causing the armature voltage thereof to increase to exceed the rated voltage of voltage regulator 45, results in the closing of valve 39 whereby the supply of air to the middle group of platens 12 is shut off.

Still further increase in the speed of motor 48 to reach production speed will cause the armature voltage of motor 48 to exceed the rated voltage of voltage regulator 46 resulting in the closing of valve 41 to end the flow of air under pressure to the surface of the downstream group of platens 12.

As long as the board 13 continues to move at production speed the solenoid valves 38, 39 and 41 remain in the closed position. As the board speed progressively decreases for any reason, the group of platens 12 equipped to receive air under pressure will have air introduced thereabove in sequence starting with the platens receiving air through solenoid valve 41 and proceeding upstream. Should the decrease in speed warrant, all of the platens so equipped will have air under pressure supplied to their upper surfaces.

A collateral factor to be noted in connection with the advantageous operation of the present invention is the fact that in addition to the arrest of the heating of board 13 by the air film, the moisture content of the board can also be controlled to a degree with this air film, since the film of air under pressure renders the platens 12 less able to deplete the board of its moisture.

It is further contemplated that compressed air which has been previously cooled may also be employed to offer an additional measure of control over the temperature of board 13 during its passage through the heating section 11.

Although the specific embodiment disclosed herein shows the introduction of air through hole 27 in lip 28 with further distribution of the air transversely of the path of the moving web by means of groove 52 (shown clearly in FIGURE 3), it would be equally feasible to inject the compressed air above upper surface 24 at positions intermediate thereof rather than near the leading edge 26. To accomplish this a reinforcing member (not shown) may be introduced extending vertically between the upper wall 53 and lower wall 54 of platen 12 to insure structural integrity of the platen and to provide protection for the extension of a branch line such as branch line 31 through the body of platen 12 to register with a hole (not shown) through upper wall 53 at some point intermediate upper surface 24. Adequate grooves similar to groove 52 may be supplied to promote the requisite distribution of the film of compressed air.

Likewise, pyrometer 43 may be located in positions other than in the position shown and described, it being necessary only to calibrate the pyrometer and the control system to produce the requisite response. Thus, the right-hand pulley for lower belt 19 could be moved to the left and pyrometer 43 could be located under sheet 13 directly below its position in FIG. 1.

As has been stated above, the construction of the heating section 11 is conventional other than for the specific details shown herein to illustrate incorporation therein of this invention. It may be seen, therefore, that the practice of this invention in no way interferes with the normal rigid mounting of the platens 12 whereby orientation of the heating surfaces 24 thereof in a level and true manner may be insured to secure maximum heat transfer.

Therefore, without employing complicated piping systems or intricate structural devices involving unnecessary capital investment and maintenance expense, the present invention provides simple, effective and reliable control over the temperature of the corrugated board in the hot section of a combiner machine by controlling the heat transfer to the board in a novel fashion and at a critical position in the apparatus.

What is claimed:

1. A mechanism for heating freshly glued webs that have been combined into a unitary corrugated board assembly comprising:
   a longitudinally extending wall having a substantially flat and smooth exterior surface for transferring heat to said board;
   means for supplying heat energy at constant temperature to the interior surface of said wall for transfer through said exterior surface to said board;
   means for moving said board past said exterior surface including means for simultaneously applying pressure to said assembly so that the heat sets the glue to maintain the assembly;
   control means for introducing air under greater than atmospheric pressure between said board and said exterior surface to create a film of air between said exterior surface and the portion of said board in juxtaposition therewith; and
   a detector comprising a pyrometer for directly measuring the tempearature of said board and actuating said control means to control the rate of transfer of heat energy from said exterior surface to said board.

2. A mechanism for heating freshly glued webs that have been combined into a corrugated board comprising:
   longitudinally extending wall having a substantially flat and smooth exterior surface for transferring heat to said board;
   means for supplying heat energy at a constant temperature to the interior surface of said wall for transfer through said exterior surface to said board;

means for moving said board past said exterior surface;

means operable on the side of said board opposite from said exterior surface for biasing the corrugated board into close contact with said exterior surface to heat the board to set the glue;

air introduction means for introducing air under greater than atmospheric pressure between said board and said exterior surface to create a film of air between said exterior surface and the portion of said board in juxtaposition therewith;

control means actuable for controlling the air to said air introduction means; means comprising a pyrometer for directly measuring the temperature of said board; and means responsive to the temperature of said board for actuating said control means to control the rate of heat transfer from said exterior surface to said board.

References Cited by the Examiner
UNITED STATES PATENTS

| | | | |
|---|---|---|---|
| 2,645,031 | 7/53 | Edwards | 34—41 |
| 2,775,046 | 12/56 | Kabelitz | 34—156 |
| 2,941,573 | 6/60 | Cassady | 34—41 |
| 2,952,078 | 9/60 | Litzler | 34—54 |

NORMAN YUDKOFF, *Primary Examiner.*